United States Patent Office 2,847,393
Patented Aug. 12, 1958

2,847,393

POLYEPOXIDE POLYESTER AND PHENOL-ALDEHYDE COMPOSITIONS AND PROCESS OF MAKING SAME

Sylvan O. Greenlee, Racine, Wis., assignor to S. C. Johnson & Son, Inc., Racine, Wis.

No Drawing. Application June 2, 1955
Serial No. 512,895

13 Claims. (Cl. 260—44)

This invention relates to new compositions resulting from the reaction of polyepoxide polyesters and phenol-aldehyde condensates and includes the initial reaction mixtures as well as the intermediate and final reaction products derived therefrom. The polyepoxide polyesters used in preparing these new compositions are the polyepoxide polyesters which may be produced by epoxidizing the polyesters of tetrahydrophthalic acid and glycols. Reaction products derived from the reaction of these polyepoxides and phenol-aldehyde condensates are valuable compositions for use in the manufacture of films, adhesives, molded articles, coating compositions, etc.

An object of this invention is to produce new compositions containing polyepoxide polyesters and phenol-aldehyde condensates in such proportions that they may undergo reaction by addition to form more highly polymerized, complex products.

Another object of this invention is to produce new compositions of the hereinbefore described character which are prepared using polyepoxide polyesters which may be selected so as to have a relatively high degree of epoxidation.

Still another object of this invention is to produce from the reaction of polyepoxide polyesters and phenol-aldehyde condensates new compositions which are useful in the manufacture of films, molded articles, coating compositions, etc., and which may be prepared with such properties as having good chemical resistance, flexibility, toughness, etc.

The foregoing and other objects and advantages are attained by the present invention, various novel features of which will become more fully apparent from the following description, with particular reference to specific examples which are to be considered as illustrative only.

The polyepoxide polyesters used in the preparation of the herein described compositions may be conveniently prepared by epoxidizing the polyesters formed in the esterification of tetrahydrophthalic anhydride and glycols. The anhydride form of the acid is usually used since esterification proceeds easily with the anhydride and since the anhydride is readily available commercially, although, of course, tetrahydrophthalic acid could be used in the esterification reaction. The polyesters may also be prepared by the reaction between glycols and simple esters of tetrahydrophthalic acid such as dimethyl or diethyl esters. This latter reaction would involve alcoholysis, or the displacing of the ethyl or methyl alcohol by the appropriate glycol.

Glycols which may be used in the preparation of the polyesters with tetrahydrophthalic anhydride include such glycols as ethylene glycol, diethylene glycol, tetramethylene glycol, pentamethylene glycol, propylene glycol, neopentyl glycol and hexamethylene glycol, as well as the longer-chain glycols such as the 36-carbon glycol prepared by sodium or catalytic reduction of the simple esters of dimerized 18-carbon soyabean oil acids. Due to the ease of dehydration under the conditions necessary for esterification, the primary and secondary glycols are the most satisfactory, since with the tertiary glycols, there is a tendency to remove the hydroxyl group and form an unsaturated bond.

The polyester compositions may also be varied somewhat by using small amounts of monofunctional reactants in the esterification reactions. By proper selection of the monofunctional reactant, different properties may be given to the resulting polyester compositions. Any excess acidity or hydroxyl content present in the polyester reaction mixture may be neutralized by reaction with a monohydric alcohol or a monobasic acid, respectively.

Polyepoxide polyesters may be prepared from these polyesters by epoxidizing the unsaturated portions of the tetrahydrophthalic acid residues in the polyester compositions. The epoxidation of these polyester compositions as well as the preparation of these polyester compositions are more fully described in a copending application having Serial No. 503,323, filed April 22, 1955.

The number of epoxide groups per molecule and the molecular weight of the composition may be controlled by adjusting the degree of polymerization which takes place, regulating the extent of the epoxidation of the polyester, and by proper selection of the glycol used in the esterification reaction with tetrahydrophthalic acid. For instance, the epoxidized polymer formed by epoxidizing the polyester of a long-chain glycol and tetrahydrophthalic acid would have a lower degree of epoxidation per given weight than the epoxidized polymer formed by epoxidizing the polyester prepared with a shorter-chain glycol, and the molecular weight of each of these compositions may be controlled by controlling the degree of polymerization in the polyester formation. Polyepoxide polyester compositions having up to 12 or more epoxide groups per molecule have been found to be useful in formulating the compositions herein described. The polyepoxide polyesters used herein may have varying structures so long as they do not contain functional groups which interfere with the desired reaction of the polyepoxide polyester and the phenol-aldehyde condensate.

The phenol-aldehyde condensates used in the preparation of these new compositions are the reaction products of phenols and aldehydes which react to form condensation products containing active hydrogen in reactive phenolic hydroxyl groups. Phenol and formaldehyde, for example, react to form these condensation products, the particular kind of condensation product formed depending upon the proportions and conditions of reaction. Included among the reaction products are such products as phenol alcohols having both phenolic and alcoholic hydroxyl groups, and products of the diphenol methylene type containing phenolic hydroxyl groups. The composition of the phenol-aldehyde condensate may also be regulated by selecting different phenols or aldehydes in the condensation reaction, or by varying the catalyst used in the condensation reaction.

Phenol-aldehyde condensates may be of various degrees of condensation so long as they have not been condensed to infusible, insoluble form. In the preparation of certain compounds it is advantageous to use a condensate which is essentially a methylol phenol and is not a polymer, in which case little condensation has occurred and the phenol-aldehyde condensate is usually in the syrupy mobile state. In other cases, it may be convenient to partially condense the methylol form to a harder, more resinous material. The degree of condensation of the methylol phenol desired is usually determined by the solubility characteristics of the condensate with the epoxide polyester composition used, as well as by the final viscosity desired for application of the product. In the methylol phenol form of condensate, as well as in the more condensed form of condensate, there is present in the composition an appreciable amount of active hydrogens, i. e., those attached to an oxygen of a hydroxyl group. Compounds containing such hydrogens will react with epoxide groups to form more highly polymerized products.

The phenol-aldehyde condensates may be prepared from mononuclear phenols, polynuclear phenols, monohydric phenols, or polyhydric phenols, so long as the condensate is miscible with the polyepoxide polyester compositions used, or so long as the polyepoxide polyester and the phenol-aldehyde condensate are mutually miscible in the solvent which is used in the reaction mixture.

The phenol-aldehyde condensate may be a heat-converting type, or it may be a permanently fusible type as in both cases the condensate reacts with the polyepoxide polyester compositions to form insoluble, infusible products.

In making the new compositions, the phenol-aldehyde condensates and the polyepoxide polyester compositions may be used in regulated proportions and without the addition of other materials. However, other constituents can be admixed with the new compositions of this invention, such as filling and compounding materials, plasticizers, pigments, etc. Some of the compositions tend to give somewhat brittle products when made without a plasticizer, so that plasticizers may be advantageously included in such compositions. The method of blending the polyepoxide compositions and phenol-aldehyde condensates will depend somewhat on their properties which control the ease of mixing the compositions, such as the softening point of the compositions.

Constituents which may be added to give somewhat varied reaction products may be inert type constituents, i. e., they may be free of functional groups, as illustrated by such plasticizers as high-boiling point esters which are compatible with the phenol-aldehyde polyepoxide polyester compositions. These inert type constituents may also be illustrated by the usual inert pigments used in the formulation of paints and enamels which may be admixed in the compositions of this invention to produce valuable enamel compositions. These constituents may, however, contain functional groups and be carried chemically by the mixture. An example of the latter type of constituent may be illustrated by the epoxide derivatives of unsaturated esters which are by-products of the fat and vegetable oil industries. Such plasticizers, by virtue of their epoxide functionality, tend to react with the active hydrogen in the phenol-aldehyde condensate and be carried into the final polymeric compositions. Because of the low epoxide content per molecule of such plasticizers, however, reaction with these plasticizers would tend to terminate the polymerization reaction. The high degree of epoxidation which may be achieved in the polyepoxide polyesters used in this invention readily permit the use of such constituents which co-convert with the phenol-aldehyde condensate to form insoluble cross-linked structures which are novel compositions of this invention.

The reactions which take place between the polyepoxide polyesters and the phenol-aldehyde condensates appear complex, and it is desired not to be limited by any theoretical explanation of the mechanism of the reaction. However, it seems probable that the reaction is in part one between an epoxide group of the polyepoxide polyester with active hydrogen attached to oxygen in the phenol-aldehye condensate. The reaction may also include further condensation of the phenol-aldehyde condensate present in the reaction mixture, as well as reaction between the epoxide groups of the polyepoxide polyester with hydroxyl groups liberated in the course of the reaction of epoxide groups with active hydrogen. In the present invention, reaction of functional groups containing active hydrogen with polyepoxide polyesters containing a relatively large number of epoxide groups per molecule, as may be prepared in the polyepoxide polyester, provides the opportunity for several linear chains to interact and produce a net-like insoluble, infusible structure.

By proper selection of the polyester and phenol-aldehyde condensate used, a mixture may be prepared which in its initial form is in a syrupy state, and, therefore, particularly well suited for the formation of protective coatings or in adhesive applications. With higher melting materials, it is often necessary to melt the materials and make the mixtures at temperatures considerably above room temperature. In the preparation of material for a molded object, a molten combination of polyepoxide polyester and phenol-aldehyde resins along with a small amount of converting agent could be poured directly into the molds.

In the formulation of materials for application as a protective coating, it is often desirable to dissolve the mixture of the two types of resins along with any converting agent which may be used in a volatile solvent. This solvent solution can be adjusted to the proper nonvolatile content to give a conveniently working viscosity for application.

To bring about polymerization of the polyepoxide resin with the phenol-aldehyde condensate, converting agents are sometimes used. These converting agents include Friedel-Crafts type catalysts such as boron trifluoride, often referred to as a Lewis acid. Since boron trifluoride has been found to be extremely active in promoting these reactions, latent type boron trifluoride catalysts are usually used, this type of catalyst liberating boron trifluoride upon the application of heat. Alternatively polybasic acids and polybasic acid anhyrides may be used. These acid materials are coupling type converting agents which take part in the reaction with epoxide groups to produce more highly polymerized products. These converting agents include such acid materials as maleic anhydride, phthalic anhydride, aconitic acid, and thiomalic acid.

It is not necessary to use a converting agent such as the catalyst or coupling type converting agent described herein, due to the fact that the epoxide groups apparently react with the phenolic hydroxyl groups present in the phenol-formaldehyde condensates, these phenolic hydroxyl groups themselves containing active hydrogen. The alcoholic hydroxyl groups present in the phenol-aldehyde condensate also may be considered to contain active hydrogen, although generally, the reactivity of these groups is not as great probably as the reactivity of the phenolic hydroxyl groups. When no converting agents are used, the temperatures of reaction may have to be elevated somewhat, or the heating period may have to be lengthened in order that complete conversion will take place.

It is sometimes desirable to partially react the mixtures of phenol-formaldehyde resin and polyepoxide polyester resin before the mixture is used. These slightly polymerized resins may then be mixed with each other and undergo further reaction to form insoluble, infusible products. For example, one might start off with a syrupy mixture of the products and apply heat until the softening point is raised to well above room temperature. This mixture may then be dissolved in a solvent to prepare a protective coating formulation. This would provide a material which would be essentially tack-free on evaporation of the solvent, yet it would be soluble and fusible at this stage. Further application of heat to the film would then convert it to an insoluble, infusible form.

It will be seen then that the herein described invention includes a wide range of compositions, including initial mixtures of phenol-aldehyde resins and polyepoxide resins, partial or intermediate reaction products of such mixtures, as well as final reaction products. Other materials containing reactive epoxide groups might also be used together with these mixtures of phenol-aldehyde and polyepoxides to give modified reaction products.

The final conversion products of this invention may be prepared with outstanding physical properties, such as toughness and flexibility, and may also be prepared with high resistance to oxidation, water and other chemicals.

The following examples will serve to illustrate the invention, however, it should be understood that the invention is not intended to be limited thereby. Proportions expressed are parts by weight unless otherwise indicated. The nonvolatile content of the polyesters and polyepoxide polyesters was obtained by heating the compositions in a vacuum oven for a period of 3 hours at 150° C. The nonvolatile content of the phenol-aldehyde condensates was determined by heating the condensate in a vacuum oven for a period of 3 hours at 110° C.

Examples I, II, and III illustrate the preparation of phenol-formaldehyde condensates which may be used in this invention.

Example I

In a 3 liter, 3-neck flask provided with a mechanical agitator, a thermometer and a reflux condenser was placed 912 parts of bisphenol [bis-p,p'(hydroxyphenol)-isopropylidene], 960 parts of 37% aqueous formaldehyde and 2.3 parts of oxalic acid. With continuous agitation, the reaction mixture was heated to the reflux temperature and refluxing continued for a period of 1 hour. After permitting the reaction mixture to cool to around 50° C., the water layer was removed by decantation. The phenol-formaldehyde layer was then washed 3 times with water, in each case removing the water by decantation. After washing, the last portion of water was removed by distillation at a pressure of approximately 30 to 40 mm. using a water aspirator system. The flask temperature during the removal of this last portion of water ranged from 70 to 90° C. The product, amounting to 1065 parts, was a clear, heavy, syrupy material.

Example II

Using the procedure of Example I, a condensate was prepared from 1000 parts of paratertiary butyl phenol, 1067 parts of 37% aqueous formaldehyde, and 10 parts of sodium hydroxide. The product, amounting to 1470 parts, was a clear, almost colorless, syrupy material.

Example III

Using the procedure of Example I, a condensate was prepared from 658 parts of phenol, 1400 parts of 37% aqueous formaldehyde and 6.6 parts of sodium hydroxide. The product, amounting to 1168 parts was a clear, syrupy material.

Example IV illustrates the preparation of a polyester from tetrahydrophthalic anhydride and a glycol, and subsequent epoxidation of the polyester to form a polyepoxide polyester composition.

Example IV

A mixture of 1.1 mol tetrahydrophthalic anhydride and 0.2 mol n-butanol was placed in a 3-neck flask provided with a thermometer, a mechanical agitator, and reflux condenser attached through a water trap. After melting the tetrahydrophthalic anhydride in the presence of the butanol, 1 mol of 1,4-butanediol was added. The reaction mixture was gradually heated with agitation to 225° C., at which point a sufficient amount of xylene was added to give refluxing at esterification temperature. The reaction mixture was then heated with continuous agitation at 225–235° C. until the acid value decreased to 8.6, a period of about 24 hours. Acid value as used herein represents the number of milligrams of KOH equivalent to the acidity present in a one-gram sample. The polyester product was a highly viscous, tacky material having slight flow at room temperature.

A dehydrated acid form of a cation exchange resin (Dowex 50X-8, 50–100 mesh, Dow Chemical Company, the sodium salt of a sulfonated styrene divinylbenzene copolymer containing 8% divinylbenzene, illustrated by the formula $RSO_3^-Na^+$ where R represents the hydrocarbon network of the polymer) was prepared by washing the resin several times with 4 to 6 normal hydrochloric acid, washing the neutralized resin with distilled water to remove excess acid and inorganic salt, and drying the product in a vacuum oven at a temperature of about 80° C. for a period of approximately 16 hours.

107 parts of the dehydrated acid form of cation exchange resin and 30 parts glacial acetic acid was placed in a 3-neck flask provided with a thermometer, a mechanical agitator, and a reflux condenser. The mixture of cation exchange resin and acetic acid was allowed to stand until the resin had completely taken up the acid.

To this mixture was added 273 parts nonvolatile of the polyester resin dissolved in an equal weight of xylene. 75 parts of 50% hydrogen peroxide was added dropwise over a period of 45 minutes to 1 hour to the continuously agitated reaction mixture. The reaction temperature was held at 60° C. requiring the application of some external heat. In some preparations involving other polyester resins, sufficient exothermic heat is produced during the addition of hydrogen peroxide so that no external heat is required, or even some external cooling may be required. The reaction was continued at 60° C. until a milliliter sample of the reaction mixture analyzed less than 1 milliliter of 0.1 N sodium thiosulfate in an iodometric determination of hydrogen peroxide. The polyepoxide ester product was then filtered, finally pressing the cation exchange resin filter cake. The acid value of the total resin solution was 56.9. The percent nonvolatile of this solution, amounting to 559 parts, was 50.

A dehydrated basic form of a salt-splitting amine type anion exchange resin (Dowex 1, Dow Chemical Company, the quaternary ammonium chloride salt of an aminated styrene divinylbenzene copolymer of 20–50 mesh containing about 8% divinylbenzene, illustrated by the formula $RR'_3N^+Cl^-$ where R represents the hydrocarbon network and R' is a methyl group) was prepared by washing the exchange resin several times with alkali, washing the neutralized resin with distilled water to remove excess alkali and inorganic salt, and drying the product in a vacuum oven at a temperature of about 80° C. for a period of approximately 16 hours.

The 559 parts of resin solution was thoroughly mixed with 175 parts of the dehydrated basic form of anion exchange resin. The resulting mixture was then filtered, followed by pressing as much of the solution as possible from the anion exchange resin cake. This polyepoxide polyester product had an acid value of 10.1 on the nonvolatile resin content and an epoxide equivalent (equivalent weight to epoxide group) of 304 on the nonvolatile resin content.

The epoxide values as discussed herein were determined by refluxing for 30 minutes a 2-gram sample with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

This resin solution is satisfactory for many uses, such as blending with active hydrogen compositions to make coating resin solutions ready for application. In cases where the solvent-free resin is desired, the solvent may be readily removed by distillation, preferably at reduced pressure under conditions where the temperature does not rise above around 60° C.

The following examples illustrate the preparation of complex reaction products from mixtures of polyepoxide polyester resins and phenol-aldehyde condensate resins. In these examples, the resin mixtures were dissolved in an equal weight of a lacquer type solvent composed of 1 part methylisobutyl ketone to 2 parts xylene, so as to give a resin solution suitable for the preparation of films.

Example V

A mixture was prepared using 304 parts nonvolatile of the polyepoxide polyester of Example IV, 162 parts nonvolatile of the condensate of Example III, and 50 parts of the converting agent, thiomalic acid. Films having a wet film thickness of .002" were prepared from this mixture and cured for 30 minutes at 175° C. The cured films were tack-free and flexible, and withstood boiling water for a period of 3 hours and 5% sodium hydroxide for a period of 6 hours without deterioration.

Example VI

Films prepared from a mixture of 304 parts nonvolatile of the product of Example IV, 81 parts nonvolatile of the product of Example II, and 50 parts of the converting agent, thiomalic acid, were cured for 30 minutes at 150° C. These films were tack-free and flexible, and withstood boiling water for 6½ hours and 5% sodium hydroxide for 45 minutes without deterioration.

Example VII

A polyester was prepared as in Example IV from 3 mols of tetrahydrophthalic anhydride, 2 mols of n-butanol, and 2 mols of ethylene glycol, the product having an iodine value of 100.5 and an acid value of 4. 252 parts nonvolatile of the polyester were epoxidized using the procedure of Example IV to yield a product having after purification an acid value of 6 and an epoxide equivalent of 268 on the nonvolatile content.

Films prepared from a mixture of 268 parts nonvolatile of this epoxidized polyester, 134 parts nonvolatile of the product of Example II, and 6 parts boron trifluoride triethanolamine adduct were cured for 30 minutes at 150° C. These films were tack-free and flexible, and withstood 5% alkali for 45 minutes.

When these films were cured for 30 minutes at 175° C., the films withstood 5% alkali for 3 hours.

When these films were cured for 30 minutes at 200° C. the films withstood 5% alkali for 7 hours.

Example VIII

Films prepared from a mixture of 304 parts nonvolatile of the product of Example IV and 304 parts nonvolatile of the product of Example I were cured for 1 hour at 200° C. without the use of a converting agent to yield tack-free, flexible films.

When the proportion of the product of Example I was reduced to 76 parts and cured for 1 hour at 200° C., similar results were obtained.

Example IX

Films prepared from a mixture of 304 parts nonvolatile of the product of Example IV, 304 parts nonvolatile of the product of Example I, and 98 parts maleic anhydride were cured for 30 minutes at 175° C. to yield tack-free, flexible films.

Other mixtures and reaction products can be prepared using various phenol-aldehyde condensates and polyepoxide polyester resins. Reaction products prepared from these reaction mixtures generally had good converting characteristics and chemical resistance. These reaction products are valuable in the manufacture of protective coatings, as well as in other applications such as adhesives and molding materials.

While it may be desirable to use a lacquer type solvent in the preparation of these reaction mixtures, in other instances, such as in the manufacture of molded articles, a solvent would ordinarily not be used as the resins, together with any converting agent, can be placed directly into the mold. In the preparation of adhesive materials, ordinarily no solvent is necessary in those cases where relatively low melting point resins are used, although a solvent in some cases may be desirable.

As can be seen in the examples, converting agents need not be used, however, if a converting agent is used, generally conversion to more highly polymerized products occurs under more moderate reaction conditions such as lower curing temperatures or shorter curing periods.

As used herein, "epoxy oxygen" refers to the —O— bridge in an epoxide composition, typically illustrated by the following:

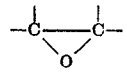

While various embodiments of this invention have been described, it should be understood that the invention is not restricted thereto, and that it is intended to cover all modifications of the invention which would be apparent to one skilled in the art and that come within the scope of the appended claims.

It is claimed and desired to secure by Letters Patent:

1. Compositions useful for the production of complex reaction products comprising polyepoxide polyesters of tetrahydrophthalic acid and glycols, said polyesters containing epoxide groups formed by replacing one bond of the olefin linkage of tetrahydrophathalic acid with epoxy oxygen, and active hydrogen-containing phenol-aldehyde condensates.

2. Compositions useful for the production of complex reaction products comprising polyepoxide polyesters of tetrahydrophthalic acid and glycols, said polyesters containing epoxide groups formed by replacing one bond of the olefin linkage of tetrahydrophthalic acid with epoxy oxygen, active hydrogen-containing phenol-aldehyde condensates, and converting agents of the group consisting of polycarboxylic acids, polycarboxylic acid anhydrides, and boron trifluoride.

3. The compositions of claim 2 wherein the ratio by weight of the polyepoxide polyesters and phenol-aldehyde condensate range from 1 to 5 parts polyepoxide polyester per 1 part phenol-aldehyde condensate.

4. Compositions useful for the production of complex reaction products comprising fusible polyepoxide polyesters of tetrahydrophthalic acid and glycols, said polyesters containing epoxide groups formed by replacing one bond of the olefin linkage of tetrahydrophthalic acid with epoxy oxygen, and fusible active hydrogen-containing phenol-aldehyde condensates.

5. The compositions of claim 4 wherein said compositions are dissolved in a lacquer organic solvent.

6. Compositions useful for the production of complex reaction products containing in substantial proportions polyepoxide polyesters of tetrahydrophthalic acid and glycols, said polyesters containing epoxide groups formed by replacing one bond of the olefin linkage of tetrahydrophthalic acid with epoxy oxygen, and active hydrogen-containing phenol-formaldehyde condensates, said compositions containing up to about one part of said condensates for one part of said polyepoxide polyesters.

7. The compositions of claim 6 wherein the condensates are condensates of formaldehyde with a phenol selected from the group consisting of phenol, bisphenol, and butyl phenol.

8. The compositions of claim 7 wherein the compositions include converting agents of the group consisting of polycarboxylic acids, polycarboxylic acid anhydrides, and boron trifluoride.

9. A process for the manufacture of plastic compositions which comprises heating a homogeneous mixture of (a) polyepoxide polyesters of tetrahydrophthalic acid and glycols, said polyesters containing epoxide groups formed by replacing one bond of the olefin linkage of tetrahydrophthalic acid with epoxy oxygen, and (b) active hydrogen-containing phenol-formaldehyde condensates, so that said mixture is converted to a more highly polymerized product.

10. The process of claim 9 wherein said mixture is heated at temperatures in excess of 150° C.

11. A process for the manufacture of plastic compositions which comprises heating a homogeneous mixture of (a) polyepoxide polyesters of tetrahydrophthalic acid and glycols, said polyesters containing epoxide groups formed by replacing one bond of the olefin linkage of tetrahydrophthalic acid with epoxy oxygen, (b) active hydrogen-containing phenol-formaldehyde condensates, and (c) converting agents of the group consisting of polycarboxylic acids, polycarboxylic acid anhydrides, and boron trifluoride, so that said mixture is converted to a more highly polymerized product.

12. Infusible reaction products prepared by curing a mixture containing substantial proportions of a polyepoxide polyester of tetrahydrophthalic acid and glycol, said polyesters containing epoxide groups formed by replacing one bond of the olefin linkage of tetrahydrophthalic acid with epoxy oxygen, and an active hydrogen-containing phenol-formaldehyde condensate, said mixture containing up to about one part of said condensate for one part of said polyepoxide polyester.

13. The infusible reaction products of claim 12 wherein said mixture contains a converting agent of the group consisting of polycarboxylic acids, polycarboxylic acid anhydrides, and boron trifluoride.

References Cited in the file of this patent

UNITED STATES PATENTS

| | | |
|---|---|---|
| 2,255,313 | Ellis | Sept. 9, 1941 |
| 2,521,911 | Greenlee | Sept. 12, 1950 |
| 2,660,563 | Banes et al. | Nov. 24, 1953 |
| 2,720,500 | Cody | Oct. 11, 1955 |